(12) United States Patent
Zheludev et al.

(10) Patent No.: US 9,606,415 B2
(45) Date of Patent: Mar. 28, 2017

(54) SUPER-OSCILLATORY LENS DEVICE

(71) Applicant: UNIVERSITY OF SOUTHAMPTON, Highfield, Southampton (GB)

(72) Inventors: Nikolay Ivanovich Zheludev, Southampton (GB); Salatore Savo, Cambridge, MA (US); Tapashree Roy, West Bengal (IN); Vassili Savinov, Southampton (GB); Mark Richard Dennis, Bristol (GB); Edward Thomas Foss Rogers, Southampton (GB); Jari Juhani Lindberg, Helsinki (FI)

(73) Assignee: University of Southampton, Southampton (GB)

( * ) Notice: Subject to any disclaimer, the term of this patent is extended or adjusted under 35 U.S.C. 154(b) by 163 days.

(21) Appl. No.: 14/376,470

(22) PCT Filed: Jan. 18, 2013

(86) PCT No.: PCT/GB2013/050114
§ 371 (c)(1),
(2) Date: Aug. 4, 2014

(87) PCT Pub. No.: WO2013/114075
PCT Pub. Date: Aug. 8, 2013

(65) Prior Publication Data
US 2015/0043048 A1 Feb. 12, 2015

(30) Foreign Application Priority Data

Feb. 3, 2012 (GB) .................................. 1201936.0

(51) Int. Cl.
G02B 26/00 (2006.01)
G02F 1/01 (2006.01)
(Continued)

(52) U.S. Cl.
CPC ............ G02F 1/21 (2013.01); G02B 27/0988 (2013.01); G02B 27/44 (2013.01); G02B 27/46 (2013.01); G02B 27/58 (2013.01)

(58) Field of Classification Search
CPC ...... G02B 27/60; G02B 3/0006; G02B 5/005; G02B 5/0257; G02B 5/08; G02B 5/122;
(Continued)

(56) References Cited

U.S. PATENT DOCUMENTS 5,105,305 A 4/1992 Betzig et al.
2002/0021869 A1* 2/2002 Griffin .................. A61B 18/22
385/43
(Continued)

FOREIGN PATENT DOCUMENTS

EP 1 412 804 B1 2/2007
EP 2 302 421 A1 3/2011
(Continued)

OTHER PUBLICATIONS

International Search Report and Written Opinion for corresponding patent application No. PCT/GB2013/050114 dated Mar. 13, 2013.
(Continued)

*Primary Examiner* — Bumsuk Won
*Assistant Examiner* — Tamara Y Washington
(74) *Attorney, Agent, or Firm* — Renner, Otto, Boisselle & Sklar, LLP

(57) ABSTRACT

A super-oscillatory lens (10) having a pre-defined pattern to spatially modulate the light beam in amplitude and/or phase which has a blocking element (6) formed integrally with the lens, or as a separate component adjacent to the lens, which is opaque to the light beam to cause diffraction of the light beam around the blocking element and formation of a shadow region (20). The lens and blocking element focus the light beam to form an elongate needle-shaped focus (15) in
(Continued)

the shadow region (20). In any application in which it is necessary to scan a small spot over a surface, compared with a conventional objective lens focus the elongate shape of the focus relaxes the requirement on a feedback loop to maintain a constant separation between a scan head and a surface being scanned. The elongate shape is also ideal shape for materials processing applications.

19 Claims, 10 Drawing Sheets

(51) Int. Cl.
G02F 1/21 (2006.01)
G02B 27/44 (2006.01)
G02B 27/58 (2006.01)
G02B 27/09 (2006.01)
G02B 27/46 (2006.01)

(58) Field of Classification Search
CPC .......... G02B 5/13; G02B 5/136; G02B 5/205; G02B 5/206; G02B 5/208; G02B 5/223; G02B 5/30
USPC ................................ 359/238; 355/52, 53, 55
See application file for complete search history.

(56) References Cited

U.S. PATENT DOCUMENTS

2005/0046818 A1* 3/2005 Neil ........................ G02B 5/001 355/55
2009/0261250 A1 10/2009 Zhou et al.
2009/0296176 A1* 12/2009 Leister ................. G03H 1/2286 359/9

FOREIGN PATENT DOCUMENTS

JP 2011-123272 6/2011
WO 2008/009931 A1 1/2008
WO 2011/100070 A1 8/2011

OTHER PUBLICATIONS

Combined Search and Examination Report for corresponding patent application No. GB1201936.0 dated May 29, 2012.
I.J. Cox et al., "Reappraisal of arrays of concentric annuli as superresolving filters", JOSA Letters, vol. 72, No. 9, pp. 1287-1291, Sep. 1982.
G. Toraldo Di Francia, "Super-Gain Antennas and Optical Resolving Power", Supplemento Al vol. IX, Serie IX Del Nuovo Cimento, 1952.
Bert Hecht et al., "Scanning near-field optical microscopy with aperture probes: Fundamentals and applications", The Journal of Chemical Physics, Mar. 7, 2012.
Fu Min Huang et al., "Super-Resolution without Evanescent Waves", Optoelectronics Research Centre, University of Southampton, NANO Letters, vol. 9, No. 3, pp. 1249-1254, Jan. 20, 2009.
Nanbo Jin et al., "Advances in Particle Swarm Optimization for Antenna Designs: Real-Number, Binary, Single-Objective and Multiobjective Implementations", IEEE Transactions of Antennas and Propagation, vol. 55, No. 3, pp. 556-567, Mar. 2007.
James Kennedy, "Particle Swarm Optimization", IEEE, pp. 1942-1948, 1995.
O'Shea, "Plane-Wave Spectrum Method", Electromagnetic Analysis of Diffractive Optical Elements, pp. 39-44, 2012.
Jacob Robinson et al., "Particle Swarm Optimization in Electromagnetics", IEEE Transactions on Antennas and Propagation, vol. 52, No. 2, pp. 397-407, Feb. 2004.
I.M. Vellekoop et al., "Focusing coherent light through opaque strongly scattering media", Optics Letters, vol. 32, No. 16, pp. 2309-2311, Aug. 15, 2007.
Haifeng Wang et al., "Creation of a needle of longitudinally polarized light in vacuum using binary optics", Nature Photonics, vol. 2, pp. 501-505, Aug. 2008.
International Preliminary Report on Patentability for corresponding patent application No. PCT/GB2013/050114 dated Aug. 5, 2014.

* cited by examiner

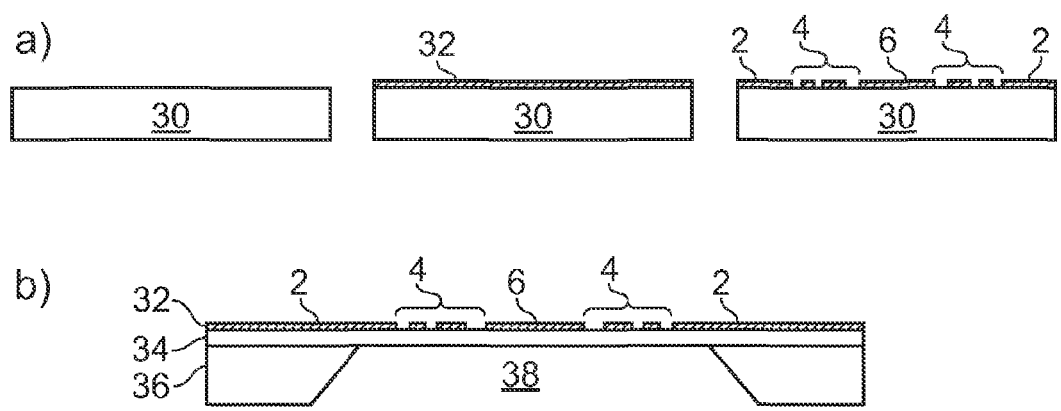
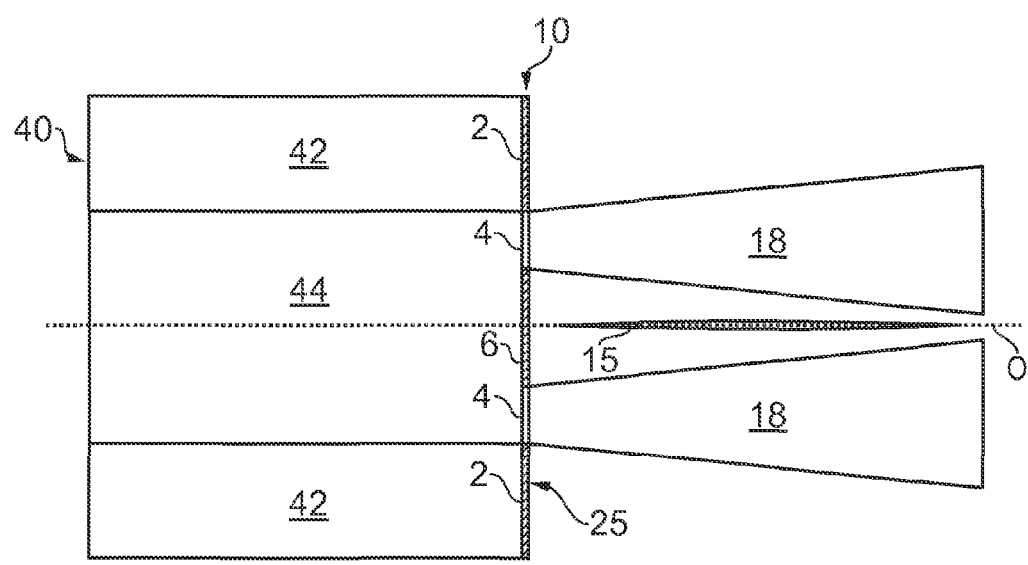

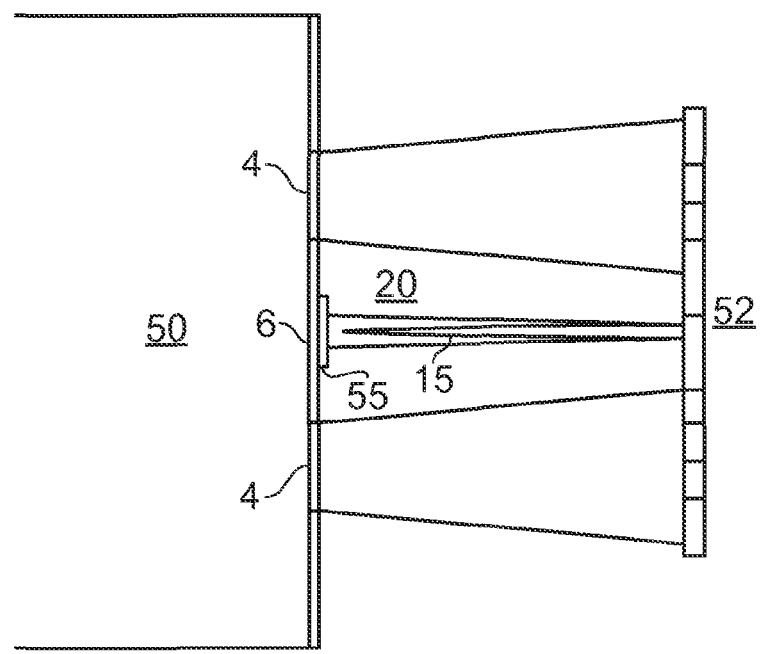
FIG. 11
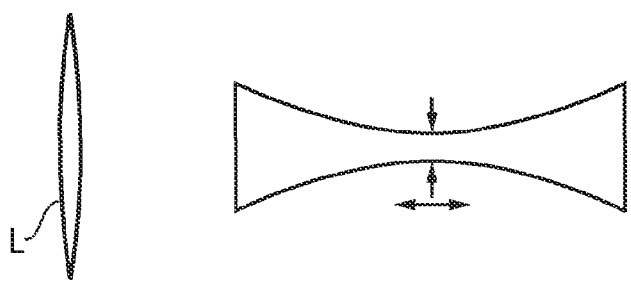
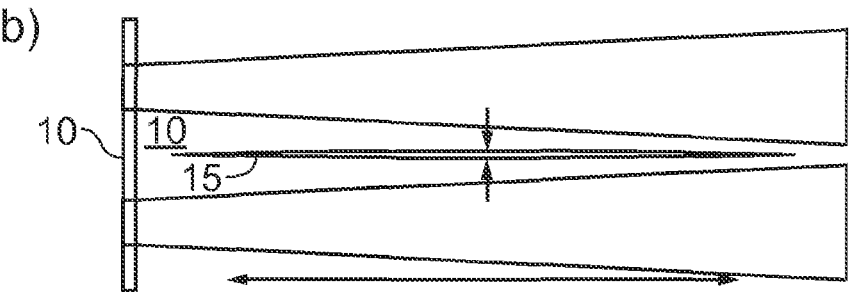
FIG. 12

SUPER-OSCILLATORY LENS DEVICE

This application is a national phase of International Application No. PCT/GB2013/050114 filed Jan. 18, 2013 and published in the English language.

BACKGROUND OF THE INVENTION

The invention relates to super-oscillatory lens devices and methods.

The last decade has seen numerous efforts to achieve imaging resolution beyond that of the Abbe-Rayleigh diffraction limit, which proscribes the visualization of features smaller than about half of the wavelength of light with optical instruments. The main direction of research aiming to break this limit seeks to exploit the evanescent components containing fine detail of the electromagnetic field distribution.

Scanning near-field optical microscopy (SNOM) has been well developed since the work of Betzig on optical fibre tips in the early 1990's [1, 2]. Other near-field imaging techniques have also been developed. Near-field imaging techniques exploit evanescent fields so require samples to be positioned very close to a scanning tip which makes the imaging process very difficult to achieve compared with conventional far-field optics.

More recently a proposal has been made by Zheludev, Huang and co-workers for achieving imaging resolution beyond that of the Abbe-Rayleigh diffraction limit away from the near-field by using an optical mask to modulate a spatially coherent optical field in amplitude and/or phase [3]. The optical mask is defined so as to create constructive interference of waves known as super-oscillation. Super-oscillation leads to a sub-wavelength focus in a field of view beyond the evanescent fields.

SUMMARY OF THE INVENTION

According to a first aspect of the invention there is provided an optical device comprising: a super-oscillatory lens arranged to receive a light beam having one or more wavelength components, the lens having a pre-defined pattern to spatially modulate the light beam in amplitude and/or phase; and a blocking element formed integrally with the lens, or as a separate component adjacent to the lens, which is opaque to the light beam to cause diffraction of the light beam around the blocking element and formation of a shadow region, wherein the super-oscillatory lens is structured and the blocking element dimensioned so that in combination they focus the light beam to form an elongate needle-shaped focus in the shadow region.

The needle-shaped focus preferably extends over a distance of at least 'n' wavelengths of at least one of the wavelength components, where 'n' is at least 3, 4, 5, 10 or 20.

In some embodiments, the needle-shaped focus has a full width half maximum of less than half the wavelength of said at least one of the wavelength components, preferably over its full length.

A light source may be provided as part of the device, the light source being operable to generate the light beam.

There are various options for fabricating the super-oscillatory lens. The super-oscillatory lens can be formed from a binary mask which is generally opaque but is structured with a pre-defined pattern of optically transparent apertures to spatially modulate the light beam in amplitude. The binary mask is typically fabricated with an opaque material supported on a substrate of transparent material, such as a metal on silicon nitride. The substrate may be thinned over the area of the lens so that the lens is a membrane structure. However, it could be envisaged to fabricate a free-standing binary mask of opaque material only. The optically transparent apertures may comprise a plurality of concentric rings and/or a plurality of holes. The super-oscillatory lens optionally additionally includes a spatial light modulator arranged adjacent to the binary mask and operable to spatially modulate the light beam in phase and/or amplitude.

The super-oscillatory lens can be formed from a spatial light modulator which is programmable to provide a pre-defined spatial modulation of the light beam in phase and/or amplitude. Optionally other kinds of spatial modulators could be used, such as the plasmonic mask for combined phase and amplitude modulation proposed by Huang & Zheludev [4].

The device can incorporate a detector for detecting light scattered from the focal region of the lens. A detector can be arranged in a dark part of the shadow region behind the blocking element and facing the needle-shaped focus to collect back-scattered light. A detector can be arranged downstream of the needle-shaped focus. A detector may also be arranged in various other configurations, such as to the side of the focus and may also be arranged to avoid collecting unscattered light directly from the needle-shaped focus. Arbitrary combinations of multiple detectors in different configurations may also be used.

There are several particular features of the needle-shaped focus which are of relevance for applications.

One feature relevant for applications is that an elongate focus in the z-direction, i.e. along the optical axis or propagation axis of the lens, is a great advantage in any application in which it is necessary to scan a small spot over a surface, since the requirements of a feedback loop to maintain a constant separation between the scan head and the surface being scanned is significantly relaxed. To explain this, the situation in conventional optics is briefly summarised. In a conventional focus, there is a single focal plane, and this focal plane must be maintained coincident with the surface being scanned. Consequently, any deviation between the focal plane and the plane of the surface defocuses the spot. Moreover, with conventional optics, if a small focal point is needed close to the diffraction limit, the numerical aperture will need to be high and hence the depth of focus will be small. A typical solution is to use some kind of autofocus in a feedback loop with the z-positioning control. In many applications maintaining stability in this feedback loop is a considerable engineering challenge. Often the speed of the autofocus is what limits the scanning speed of the system. In particular, for low contrast objects, such as living cells, the autofocus can be very slow. Consequences of failing to maintain the spot in focus with the surface can be significant. In an imaging application, varying spot size varies and reduces the resolution. In a machining/welding/heating application that relies on a threshold intensity being delivered, defocusing may destroy the intended processing function of the focus. One example of a class of devices that rely on a focused spot is a compact disc (CD) or digital versatile disc (DVD) read head and also a CD/DVD read/write head. Another example is any form of conventional far-field microscope, or similar spectroscopic device, in which single images are built up by scanning a microscope objective over an area of interest. A further example is any form of conventional far-field microscope, or similar spectroscopic device, or in which multiple images are acquired by scanning a microscope objective over an array of wells in a microtitre plate, e.g. 384 wells. With the needle focus it will be understood that all that is required is to keep the surface of the object being scanned coincident with some part of the needle Another significant feature is the ability to generate a very small focus, below the diffraction limit, in a relatively large dark region around it is of great advantage for imaging applications.

A still further significant feature is that the elongate needle-shaped focus provides the pencil beam which is generally desired for cutting, drilling and related materials processing applications. The needle-shaped focus from the super-oscillatory lens provides a pencil-like beam at the sub-diffraction limit scale. Relevant types of materials processing include lithography to expose photo-resist, machining to remove material (e.g. drilling of vias, drilling of pits, for example by pulsed laser ablation), welding to melt parts together (e.g. bonding of polymer parts in microfluidic devices), local activation of light-sensitive adhesive, and writing to phase change materials. It may be preferable to use multi-photon activated materials, such as multi-photon photo-resist, to mitigate the effect of exposure of the object with lower intensity levels of light outside the shadow region.

The needle-shaped focus is also suitable for optical coupling. In some known designs, optical circuits or optically-activated electronic circuits are arranged in a generally planar manner on a circuit board or chip. The needle-shaped focus lends itself to easy coupling into such circuit elements in view of the fact that the separation between the super-oscillatory lens and the surface of the planar device can be relatively large and also only needs to be accurate within a relatively wide range of distances corresponding to the length of the needle, and also because of the relatively large lateral extent of the shadow region. The same advantages apply more generally for coupling light into a waveguide, including laterally through an end face of a planar waveguide structure, e.g. a semiconductor nanostructure, or into an optical fibre.

According to a further aspect of the invention there is provided an optical beam lithography/machining/welding apparatus comprising: a sample platform on which an object for processing can be arranged; a head incorporating an optical device according to the first aspect of the invention; and a positioning apparatus operable to move the sample platform and head relative to each other to align the needle-shaped focus with any specified location on the sample so that activation of the light beam can be used to process the object locally.

For some applications it is preferable, and others essential, not to expose the object to light other than by the needle-shaped focus. In this respect it is noted that the light passing through the super-oscillatory lens will inherently illuminate the plane of the object outside the shadow region, albeit with an intensity several times lower than the intensity of the needle. A requirement not to expose areas of the object can be met automatically if the size of the object to be processed is sufficiently small to fit entirely within the shadow region during its interaction with the needle-shaped focus. Another way to meet this requirement is to removably deposit an additional light blocking layer on the object away from the area to be interacted with the needle focus. In conventional lithography, the light blocking layer might be a metallization on resist that can be removed after processing by a lift-off technique.

In some embodiments, the positioning apparatus is operable to scan the needle-shaped focus in a continuous way over the object such that a part of the needle-shaped focus is maintained in intersection with a surface or buried interface of the object.

According to a further aspect of the invention there is provided a materials processing method comprising: providing an object to be processed; positioning an optical device according to the first aspect of the invention at a location adjacent to a surface of the object such that the needle-shaped focus extends at that location into the object; and activating the light beam to use the needle-shaped focus to process the object locally.

The method may further comprise: scanning the optical device over the object to process the object at a plurality of locations. The processing may achieve machining of the object by removal of material from the object. The processing may achieve local melting and refreezing of material from the object.

According to a further aspect of the invention there is provided an imaging apparatus comprising: a sample platform on which an object for imaging can be arranged; a head incorporating an optical device according to the first aspect of the invention; and a positioning apparatus operable to move the sample platform and head relative to each other to align the needle-shaped focus with any specified location on the sample so that activation of the light beam can be used to image the object locally, the positioning apparatus being operable to scan the needle-shaped focus in a continuous way over the object such that a part of the needle-shaped focus is maintained in intersection with a surface or buried interface of the object.

According to a further aspect of the invention there is provided an imaging method, which may include spectroscopic collection of light, comprising: providing an object to be imaged; positioning an optical device according to the first aspect of the invention at a location adjacent to a surface of the object such that the needle-shaped focus coincides with the surface at that location; activating the light beam to use the needle-shaped focus to probe the surface locally at said location; detecting light from said location (e.g. spectrally reflected light, or light generated as a result of the probe, e.g. by luminescence, and Raman scattering) with the detector; and scanning the optical device over the object to probe the surface at a plurality of locations (e.g. moving the optical device which forms a scanning head and/or moving the object by moving a platform on which the object is arranged). This type of imaging would be an alternative to scanning near-field optical microscopy (SNOM) for providing sub-diffraction limit resolution.

Preferably the radius of the blocking area is at least 2, 3, 5, 10 or 20 wavelengths radius.

Preferably the length of the optical needle is 20%-500%, 33%-300% or 50%-200% of the radius of the blocking area of the lens.

Preferably the needle has a length to width (minimum width if the width is direction dependent) aspect ratio of at least 3:1, 4:1 5:1, 7:1, 10:1 or 15:1.

Typically the lens is adapted to provide a needle focus within a homogeneous isotropic medium (rather than in for example a meta-material). Examples of suitable media include air, vacuum, water, oil, plastic (polymer) and glass.

The lens is adapted to provide a needle focus in the region of propagating waves (rather than the region of evanescent waves).

The term needle means a substantially continuous line, rather than a line of discrete separated points.

BRIEF DESCRIPTION OF THE DRAWINGS

FIG. 1a is a conceptual sketch in end view of a super-oscillatory lens device with an integral blocking element.

FIG. 1b is a conceptual sketch in side view of the super-oscillatory lens structure of FIG. 1a.

FIG. 5a illustrates stages in a fabrication process from left to right.

FIG. 5b shows an additional option in which the mask is fabricated on a thin silicon nitride membrane arranged on a silicon supporting substrate.

FIG. 6 shows an optical needle super-oscillatory lens that has been fabricated directly onto the end face of an optical fibre.

FIG. 11 shows an optical memory read/write apparatus example based on the optical needle super-oscillatory lens.

FIG. 12a shows a focus with a conventional lens.

FIG. 12b shows a focus in an optical needle super-oscillatory lens.

DETAILED DESCRIPTION

Figure 1:
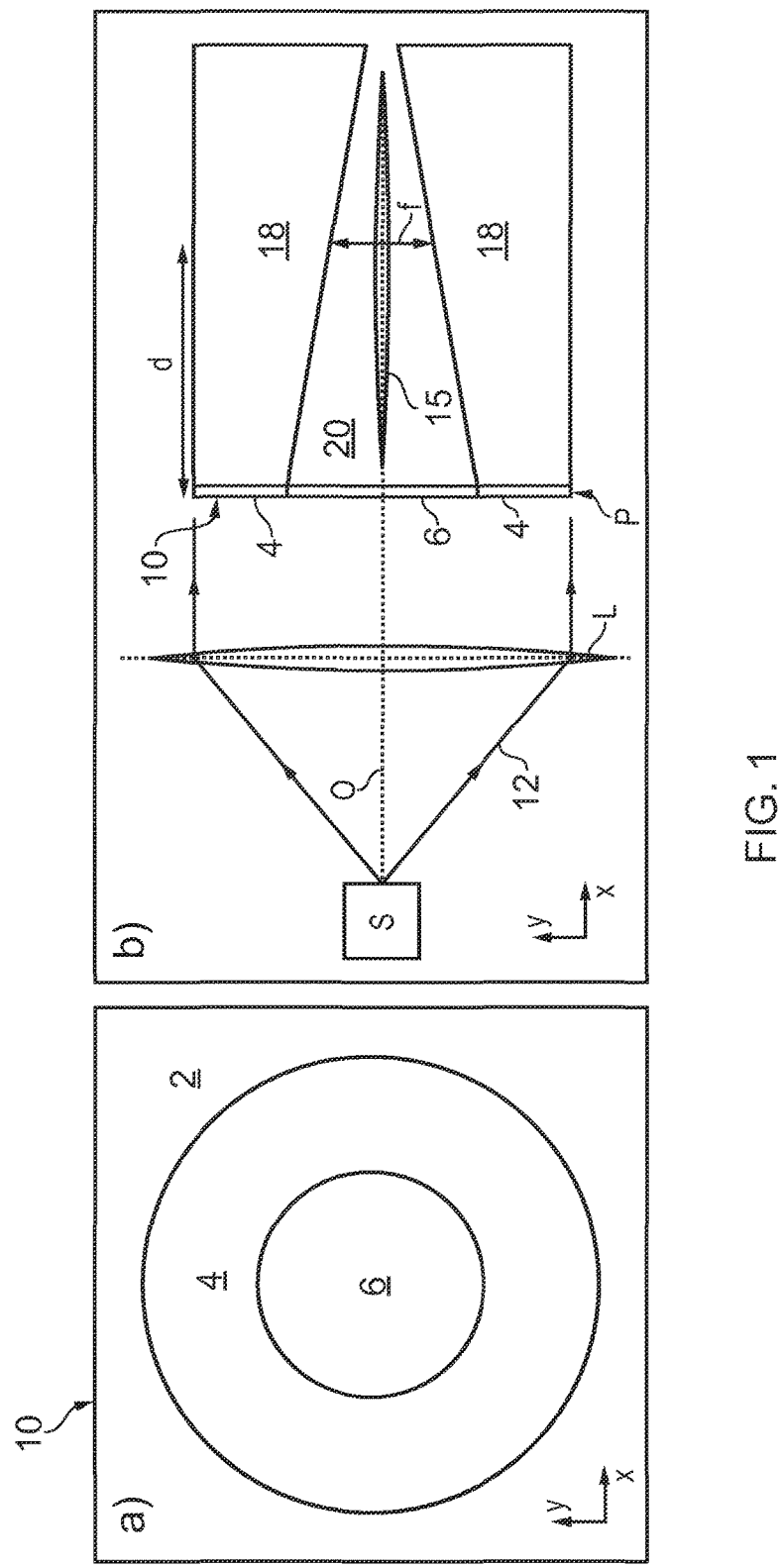

FIG. 1a is a conceptual sketch in end view of a super-oscillatory lens 10. The super-oscillatory lens 10 can be formed by a planar mask which defines a blocking area 6 which is opaque to an incident light beam surrounded by a structured, super-oscillatory lensing region 4 which carries a pre-defined pattern to modulate light from the incident light beam in amplitude or phase or both. The region outside the mask, referred to as a surrounding area 2, can be either opaque or transparent depending on overall design considerations for the particular application of interest.

FIG. 1b is a conceptual sketch in side view of the super-oscillatory lens structure 10 of FIG. 1a. A light source S generates light 12 which is output onto a conventional convex lens L which collimates the light beam and directs it to be incident on the super-oscillatory lens 10. The incident light beam 12 is spatially coherent across the area of the super-oscillatory lens device, or at least the structured part 4 thereof. As illustrated, the light source S, conventional lens L and super-oscillatory lens 10 are arranged on an optical axis O extending in the propagation direction of the light. The super-oscillatory lens 10 lies in a plane P perpendicular to the optical axis O. The incident light beam may be collimated, as schematically illustrated, or may be non-collimated such as when the incident light beam is received by the super-oscillatory lens 10 directly from a point source such as the output of an optical fibre. The blocking area 6, which is arranged centrally in the mask in respect to its principal optical axis O, is designed to prevent any light passing through. The outer region of the mask, the structured area 4, is structured in such a way as to cause a proportion of the incident light to be brought to a sub-diffraction limited focus, a so-called super-oscillatory "hot spot". More specifically, the structured area 4 is structured in such a way as to cause the sub-diffraction limited focus to have the form of an extended, elongate, sub-diffraction limited focus which is referred to in this document as an optical needle 15. Moreover, the optical needle focus is formed in an otherwise dark, shadow region 20 created by the opaque blocking element 6 blocking the incident beam 12. The shadow region 20 initially has the same cross-sectional shape and size as the blocking area 6, but as the light propagates beyond the plane P of the super-oscillatory lens structure it becomes smaller with increasing propagation distance d, and eventually disappears, as diffraction effects act on light that has passed through the structured part of the super-oscillatory lens device. The region occupied by the conventionally diffracted light beyond the super-oscillatory lens device is referred to as the sideband region 18.

Focusing to the needle-shaped focus 15 is achieved by interference of the light passing through the structured area 4 in combination with the blocking of the light by the opaque blocking area 6. The structured area is designed so as to cause constructive interference of light in the optical needle region. The needle will not be formed in the far field of the mask, but will be in the post evanescent near-field (i.e. at a propagation distance of more than one wavelength from the mask). The optical needle 15 is well separated from the rest of the light passing through the mask and propagating into the sideband region which constitutes unwanted signal. At a given propagation distance, d, downstream from the plane P of the mask along the optical axis O, the distance in a plane parallel to the mask, i.e. perpendicular to the optical axis, in which there are no sidebands of significant intensity is termed the field of view, f. In typical examples implemented to date, the full width half maximum (FWHM) of the optical needle is around one third of the wavelength of the focused light. Moreover, in these examples, the field of view varies from approximately the same as the blocking area close to the plane of the lens to a smaller value of a fraction of the size of the blocking area at greater propagation distances. Moreover, the length of the optical needle, i.e. its size along the optical axis O or in the direction of propagation z, is approximately similar to the size of the blocking area.

It should be noted that current experimental realisations have the blocking area in the plane of the structured lens as illustrated schematically in FIG. 1b. However, simulations have shown that a similar effect can be achieved with the blocking element positioned after the lens, for example up to about 20 micrometers from the plane of the lens at visible wavelengths. The blocking area could therefore be provided by depositing a separate opaque layer on a super-oscillatory lens element, or by placing a separate blocking element adjacent to a super-oscillatory lens element.

Figure 2:
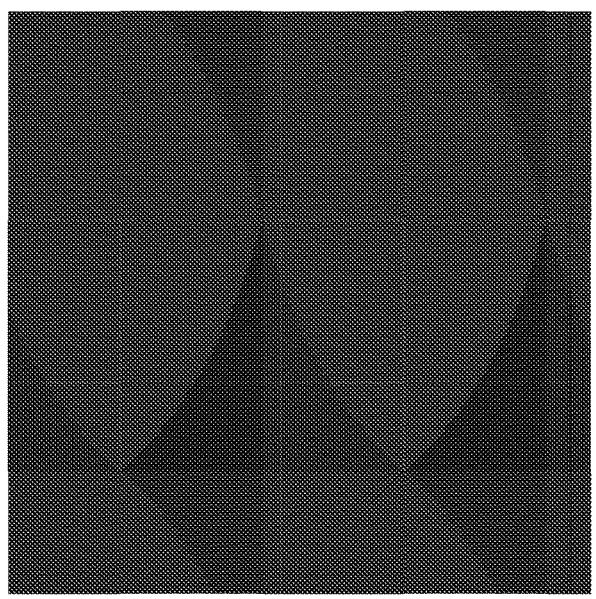
FIG. 2 shows schematically one type of structure for a super-oscillatory lens device for producing an optical needle.

FIG. 2 shows schematically one type of structure for a super-oscillatory lens device for producing an optical needle. The lens device is formed as a binary amplitude mask to be used in transmission and is made of opaque regions (black) and transparent regions (white). Here, the mask is formed from a series of transparent ring regions of different radial thickness arranged concentrically about the principal optical axis of the lens and radially outside the central blocking area. The transparent rings transmit the light incident on the mask and the structuring diffracts the light in a complex pattern which interferes to form the optical needle beyond the mask. This mask can be implemented using a metal film as the opaque region, with the white areas patterned as holes in the film to transmit light.

Any spatially coherent source can be used to generate the incident light beam. For example, any laser source which may be a continuous wave laser or a pulsed laser may be used. Example suitable laser sources are a diode laser, a fibre laser, a solid state laser, and a gas laser. A requirement of the light source is that the beam incident on the super-oscillatory lens must be substantially spatially coherent across the surface of the lens, or at least the structured part of it. The lens will normally, although not always, be designed to operate with an incident beam in the form of a plane wave incident on the surface of the lens. In this case, some care must be made to ensure that the beam incident on the lens has a substantially uniform intensity and phase across the lens area, as is the case with a conventional optical lens. However, since the super-oscillatory lenses envisaged in this document can, and will typically, be much smaller than conventional optical lenses, e.g. microscope objective lenses, meeting the condition for uniform intensity and phase across the lens is much easier to fulfil. In this respect, a super-oscillatory lens as described herein may have a typical input aperture diameter in the range of 40-400 micrometers, whereas a typical range of input aperture diameters for conventional lenses is 3-15 millimeters.

FIGS. 3a to 3d are scanning electron microscope (SEM) images of different test structures.

Figure 3:
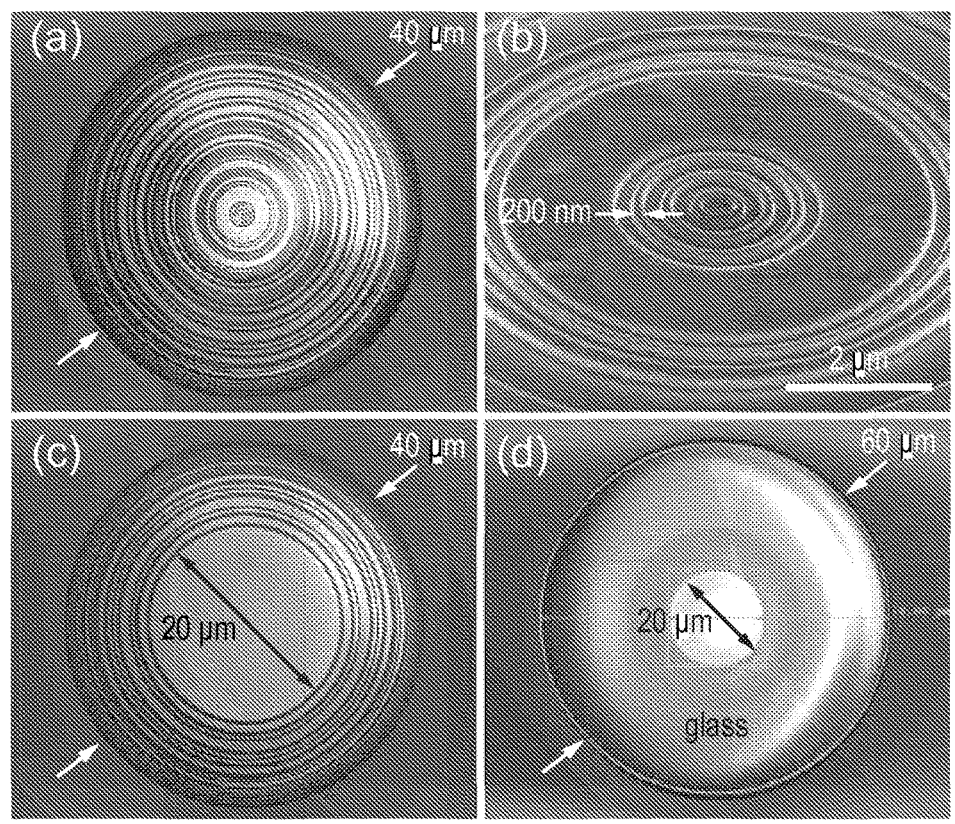
FIGS. 3a to 3d are scanning electron microscope (SEM) images of different test structures.

FIG. 3a shows a super-oscillatory lens according to the prior art formed of a series of transparent rings. The lens has a diameter of 40 micrometers.

FIG. 3b is a zoomed-in view of the prior art lens of FIG. 3a showing the centre region with the most centrally located transparent rings having a width of about 200 nm and the innermost transparent ring being positioned only a few hundred nanometers from the centre of the lens.

FIG. 3c shows an optical needle super-oscillatory lens according to an example of the invention, i.e. a super-oscillatory lens as shown schematically in FIG. 2. The lens has an overall diameter of 40 micrometers comprising a central blocking area of diameter 20 micrometers formed by a gold disc surrounded by a 10 micrometer thickness annular-shaped structured area between radii of 10 and 20 micrometers, i.e. having an inner diameter of 20 micrometers and an outer diameter of 40 micrometers, formed by a series of concentrically arranged transparent rings designed to generate an optical needle.

FIG. 3d shows a control device which is an unstructured disc of diameter 60 micrometers made of transparent glass with a gold disc at its centre of diameter 20 micrometers. The control device is used to demonstrate the classical optics effect of illuminating an opaque body, i.e. classical diffraction.

The test structures are created by focused ion beam milling of 100 nm thick gold film on a glass substrate. To perform comparative testing, the test structures are illuminated by a collimated laser beam from a 640 nm diode laser which is linearly polarized. In the experiment, the exact polarisation direction was not controlled. The direction of propagation or the optical axis is defined as the z direction.

Figure 4:
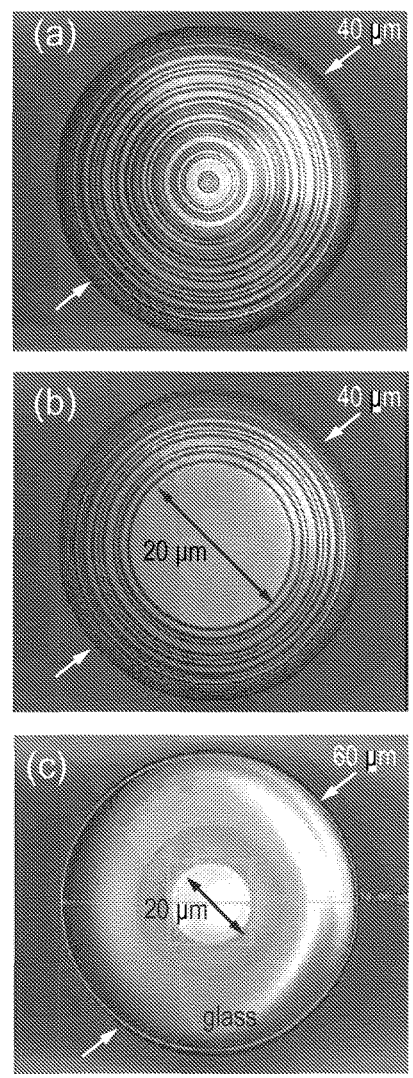
FIGS. 4a to 4c are pairs of graphs showing results from the tests for each of: the known prior art lens of FIG. 3a/b; the lens according to an example of the invention of FIG. 3c; and the unstructured glass control device of FIG. 3d respectively.
FIGS. 4d to 4f are pairs of graphs showing results from the tests for each of: the prior art lens of FIG. 3a/b; the lens according to an example of the invention of FIG. 3c; and the unstructured glass control device of FIG. 3d respectively.
Figure 4:
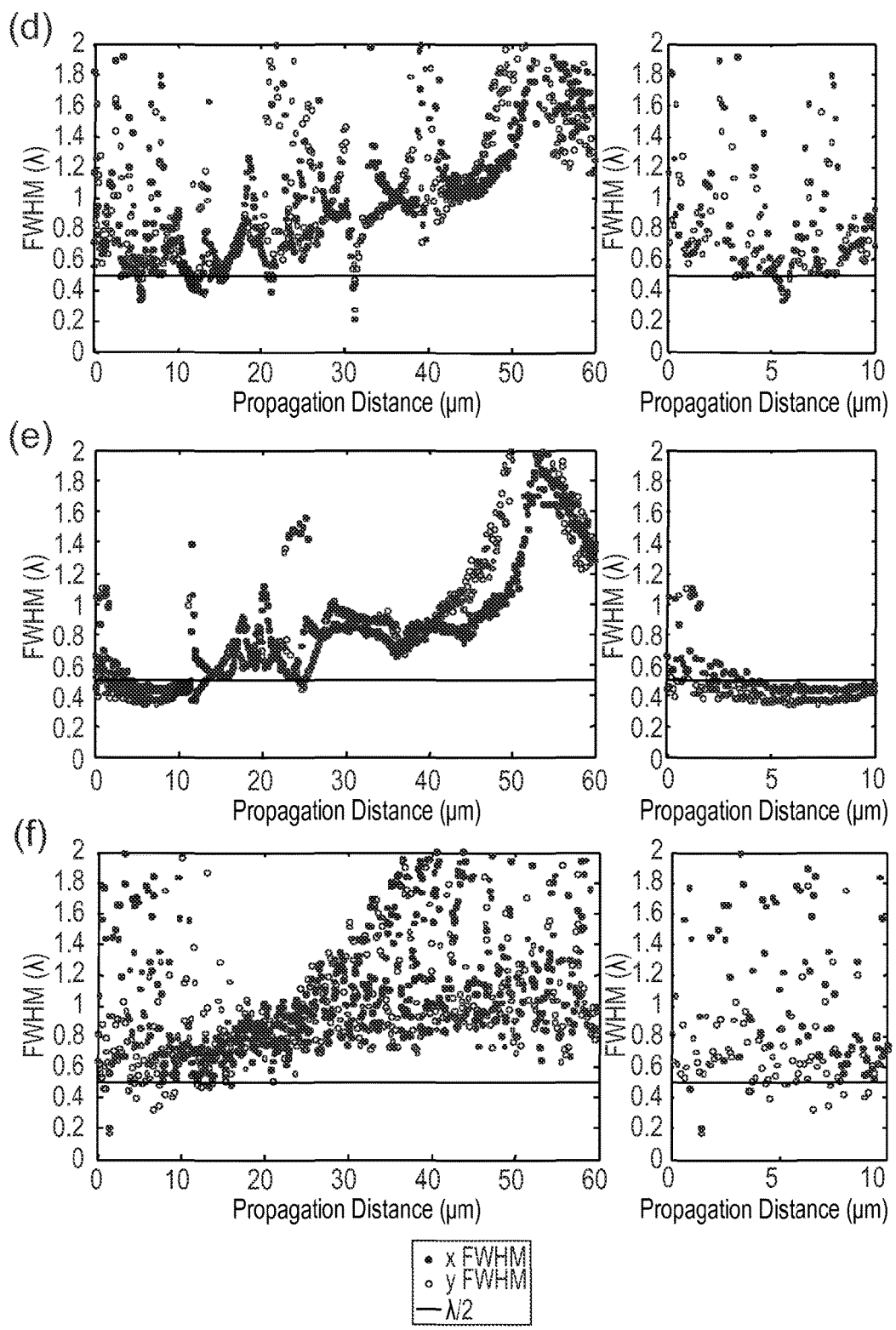

FIGS. 4a to 4c are pairs of graphs showing results from the tests for each of: the prior art lens of FIG. 3a/b; the lens according to an example of the invention of FIG. 3c; and the unstructured glass control device of FIG. 3d respectively.

Each graph shows the variation of FWHM in each of the x direction (solid circles) and y direction (hollow circles) with propagation distance d away from the plane P of the lens. The FWHM values are not equal in x and y as a result of the linear polarization of the incident light. The right hand graph of each pair shows an expanded view for shorter propagation distances from 0 to 10 μm, whereas the left hand graph of each pair shows a larger range of propagation distances from 0 to 60 μm. For comparison, a FWHM value of half a wavelength, $\lambda/2$, is also shown for reference by a continuous solid line.

FIG. 4a shows the prior art super-oscillatory lens produces several focal spots along the propagation axis, of varying intensity and length along the optical axis, with sidebands of significant intensity on either side of the spots. Specifically, four distinct focal spots smaller than $\lambda/2$ can be seen at propagation distances of about 6, 12, 21 and 31 micrometers. This kind of result is representative of what is observed both from simulations and experimental data for a significant number of such prior art super-oscillatory lenses.

FIG. 4b shows the optical needs super-oscillatory lens which produces a single optical needle at propagation distances d from 4 to 12 μm from the lens with almost constant FWHM of around 0.4 wavelengths. Significantly there are no sidebands of significant intensity within ±10 μm of the needle in the x and y directions.

FIG. 4c shows comparative results for the simple disc. Some sub-$\lambda/2$ spots are formed in the region behind the disc, but they are much weaker than the spots formed by either the prior art super-oscillatory lens or the optical needle super-oscillatory lens.

A design method for designing an optical needle super-oscillatory lens comprising a central blocking area and a series of transparent concentric rings is now described. The region surrounding the lens is assumed to be opaque. Similar techniques could be applied to other structures.

We consider a radially symmetric binary-amplitude mask located at the plane z=0, which is illuminated by a monochromatic (wavelength $\lambda$) plane wave propagating in the z direction. For the region $r<R_b$, the mask is opaque, where r is the radial coordinate and $R_b$ is the radius of the blocking area. The optimisation is then applied to determine the structure of the structured area.

The structured area is divided into N unit cells (pixels), i.e., concentric annuli, where each pixel has either unit or zero transmittance. The field at any plane z>0 can be calculated using the angular spectrum method (see e.g. [5]) as $$U(r,z) = 2\pi \int_0^{1/\lambda} A(\rho)e^{iz\sqrt{k^2-4\pi^2\rho^2}} J_0(2\pi\rho r)\rho d\rho$$

where we consider only the propagating waves with $\rho \leq 1/\lambda$. Here $A(\rho)$ is the angular spectrum at z=0, $\rho$ is the transverse spatial frequency, k is the wavenumber, and $J_0$ denotes the zero-order Bessel function.

The angular spectrum for an annulus, i.e., a single pixel with unit transmittance, with the inner radius $R_i$ and the outer radius $R_o$ is $$A(\rho) = R_o \frac{J_1(2\pi R_o \rho)}{\rho} - \frac{R_i J_1(2\pi R_i \rho)}{\rho}$$

where $J_1$ denotes the first-order Bessel function.

The transmitted field from each individual pixel at a specified distance z>0 is stored into a database, which enables fast evaluation of the total field at the focus as a superposition of the field from each pixel weighted by the corresponding pixel transmittance (0 or 1). The mask profile, which is represented by a N-bit binary string, is optimized using the binary particle swarm optimization (BPSO).

Particle swarm optimization (PSO) [6-8] is a nature-inspired evolutionary algorithm for stochastic optimization. In PSO algorithm the swarm consists of a certain number of particles, which move in the N-dimensional search space to find the global optimum. Each particle represents a possible solution to the design problem. The quality of the particles is defined by a merit function and the movement of the particles is guided by the global best position $g_j$ (j=1, ..., N), the best value attained by the whole swarm, and the personal best position $p_{ij}$, the best value attained by the individual particle i.

In BPSO [8] the position of each particle is represented by a binary vector of length N. The particle velocity is a real vector of length N with values in $[-V_{max}, V_{max}]$ where $V_{max}$ is the maximum velocity. In BPSO the velocity vector gives the probability of the bit change in the position vector update. The initial swarm is generated with random starting positions and velocities. The update of the velocity vector for the particle i given by [8]

$$v_{ij}^{t+1} = v_{ij}^t + c_1 r_1 (p_{ij}^t - x_{ij}^t) + c_2 r_2 (g_j^t - x_{ij}^t)$$

where t is the iteration counter, $c_1$ and $c_2$ are constants, and $r_1$ and $r_2$ are random numbers in (0,1). The sigmoid transformation $S(v)=[1+\exp(-v)]^{-1}$ is used to map the velocity v to a subset of (0, 1) and the particle position is updated as [8]

$$x_{ij}^t = \begin{cases} 1, & r_{ij}^t < S(v_{ij}^t) \\ 0, & r_{ij}^t \geq S(v_{ij}^t) \end{cases}$$

where $r_{ij}^t$ is a random number in (0, 1). The PSO parameters have been chosen as $c_1=c_2=2.0$ and $V_{max}=6.0$ [8].

To optimise the mask to produce an optical needle, we apply the BPSO to only the structured area of the mask, where the size of the blocking area is fixed. As the merit function to minimise, we use the mean squared error from a target function along the whole z region of interest. In this case we choose the target function to be a Guassian with fixed width, typically around one third of the wavelength. It should be noted that the optical needle cannot achieve this profile exactly, (as it would require a sub-diffraction-limited spot with no sidebands, which is not physical) but that optimisation to approach this target is effective. The target function at each distance is normalised to the total energy in the diffracted spot, so the target function does not currently optimise the intensity along the z axis.

Typical parameters for our use of BPSO to design a nanostructured mask are an overall mask radius of 20 micrometers, with a blocking area of radius 10 micrometers. The structured area is typically divided into N=50 rings. Typically we use a swarm of 60 particles and 10000 iterations.

We now describe a method for fabricating a binary optical needle super-oscillatory lens.

FIG. 5a illustrates stages in a fabrication process from left to right.

A substrate 30 is provided. The substrate 30 could be any material transparent to the wavelength of light being used; possible options include: fused silica, quartz, silicon nitride, or any other glass.

An opaque layer 32, such as a layer of metal, is deposited or otherwise created on the substrate 30. The layer can be formed of any material that is opaque to the wavelength of light being used. The layer can be deposited in a thin film. Possible options for a metal film include: gold, aluminium, titanium, chromium and many other metals. For example, a 50-100 nm thickness layer of gold or aluminium is deposited onto a transparent silica substrate. The layer is deposited by either electron beam vapour deposition or thermal evaporation, for example.

The layer 32 is then patterned in an annular area to form the structured area 4 around the unstructured blocking area 6 and within the surrounding area 2. The structuring is done according to the pre-designed pattern to create the structured area 4. A metal film can be suitably patterned using focused ion beam milling to remove the metal in the required areas, for example.

FIG. 5b shows an additional option in which the lens-forming mask is fabricated on a thin silicon nitride membrane (commercially available, see, for example, www.silson.com.). A silicon substrate 36 is provided. A silicon nitride layer 34 is formed on an upper surface of the substrate 36. The back side of the silicon substrate 36 is etched over an area 38 at least as large as the outer diameter of the structured area of the mask to remove silicon up to the bottom of the silicon nitride layer. An opaque layer 32 is then deposited on top of the silicon nitride layer and then structured to form a super-oscillatory lens device as described in relation to FIG. 5a. The back side of the silicon substrate 36 is etched over an area 38 at least as large as the outer diameter of the structured area of the mask to remove silicon up to the bottom of the silicon nitride layer. The mask is thus arranged on a membrane. With this arrangement, the structured part of the lens is almost free standing so any undesirable optical effects from the nominally transparent substrate are reduced to a minimum.

FIG. 6 shows an optical needle super-oscillatory lens 10 that has been fabricated directly onto the end face 25 of an optical fibre 40 as an alternative to free-space coupling of the incident beam into the super-oscillatory lens. In other words, the end face 25 of the fibre 40 effectively forms the substrate as described in relation to FIG. 5a and the optical axis of the super-oscillatory lens is aligned with the optical axis O of the fibre. The optical fibre 40 illustrated has a waveguiding core 44 in which the incident light beam propagates surrounded by a cladding region 42. The optical fibre could be single mode or multi-mode. Other more specialised forms of optical fibre could also be used, e.g. incorporating multiple cores or multiple cladding regions. Polarisation maintaining fibre could also be used.

The super-oscillatory lens 10 with its areas 2, 4 and 6 brings the incident light coupled through the fibre core 44 to an optical needle focus 15 formed in a shadow region 20 formed within a sideband region 18 in the same manner as described further above for the free-space coupled device.

A super-oscillatory lens positioned directly on the output of an optical fibre or other waveguide can act to convert light propagating in the waveguide into an optical needle without the need for external devices or the complex alignment of a waveguide to a separate lens. The manufacture can be done by directly depositing and patterning a metal film on the waveguide output facet, or by manufacturing the super-oscillatory lens on a thin substrate which could be cemented or otherwise fixed to the output facet of the waveguide. The same approach could be used to fabricate an optical needle super-oscillatory lens on the end facet of other types of waveguide, for example on the side face of a semiconductor laser structure or the end face of a planar waveguide such as in a lithium niobate structure.

In different embodiments, the structured area of the super-oscillatory lens could be structured in a number of ways to achieve the formation of an optical needle. The structured area could, as described above, be formed by a series of concentric rings. Other alternatives include holes arranged in a random, semi-random, quasi-periodic or periodic patterns. The holes could have any shape, and need not necessarily be round. The holes may all be the same size or may vary in size.

FIGS. 7a to 7f illustrate six example optical needle masks to provide a visual impression of the amount of variety in the patterning that is possible. The common feature of the blocking area is apparent in the centre of each mask, but the patterning of the structured area varies considerably between the different examples. The scale bar is 10 µm long in all images.

Figure 7:
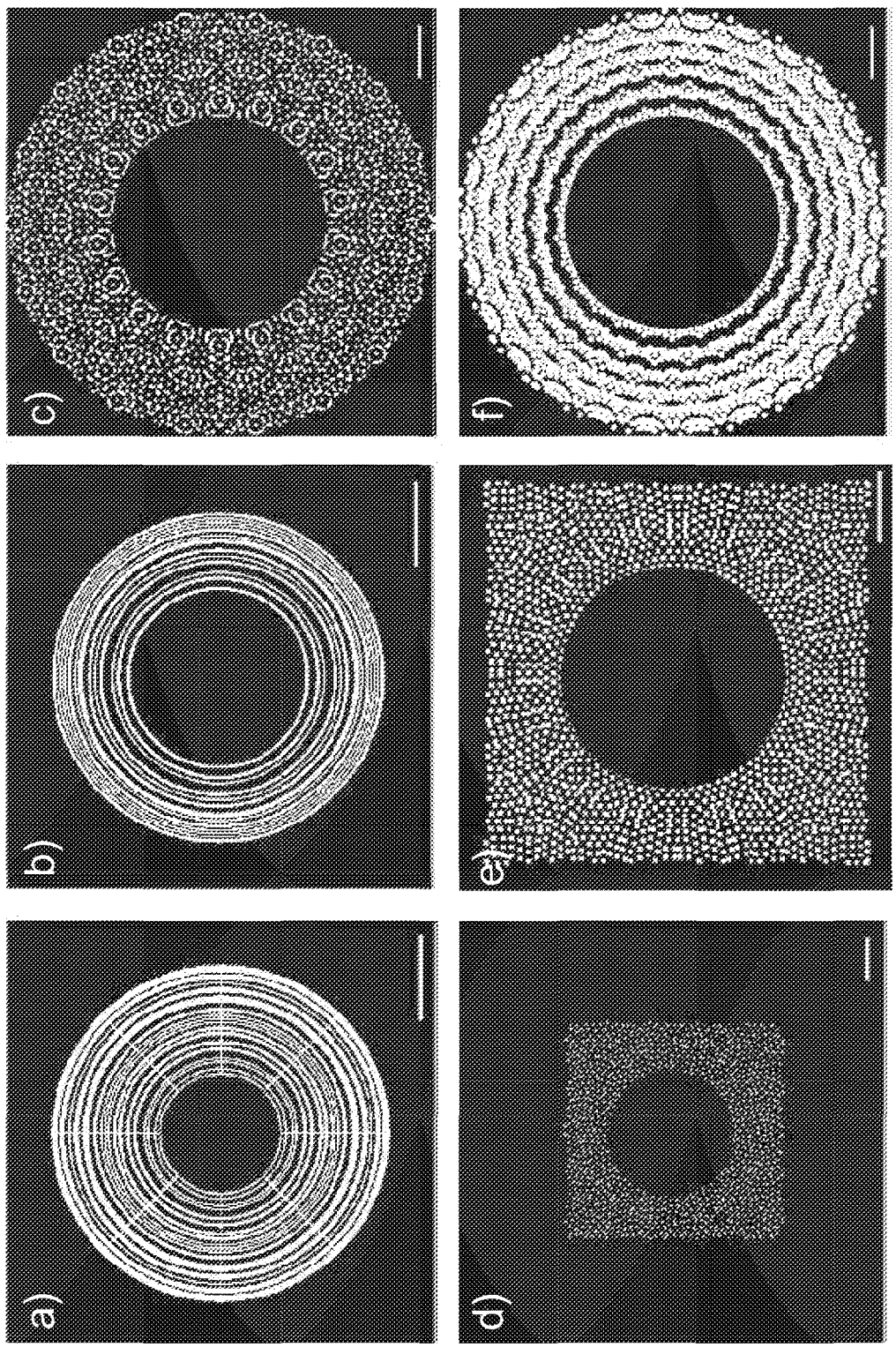
FIGS. 7a to 7f illustrate six example optical needle masks to provide a visual impression of the amount of variety in the patterning that is possible.

FIG. 7a is a mask formed of concentric rings, supported by spokes to ease fabrication, with a small blocking region. This indicates that the circular symmetry of the mask is not essential.

FIG. 7b is a mask of concentric rings with a relatively large blocking region compared to structured region.

FIG. 7c is a circular 27-fold symmetric quasiperiodic array of small round holes.

FIG. 7d is a square 13-fold symmetric quasiperiodic array of small round holes.

FIG. 7e is a square 20-fold symmetric quasiperiodic array of square holes.

FIG. 7f is a circular 13-fold symmetric quasiperiodic array of large holes. In this case the holes overlap considerably.

Figure 8:
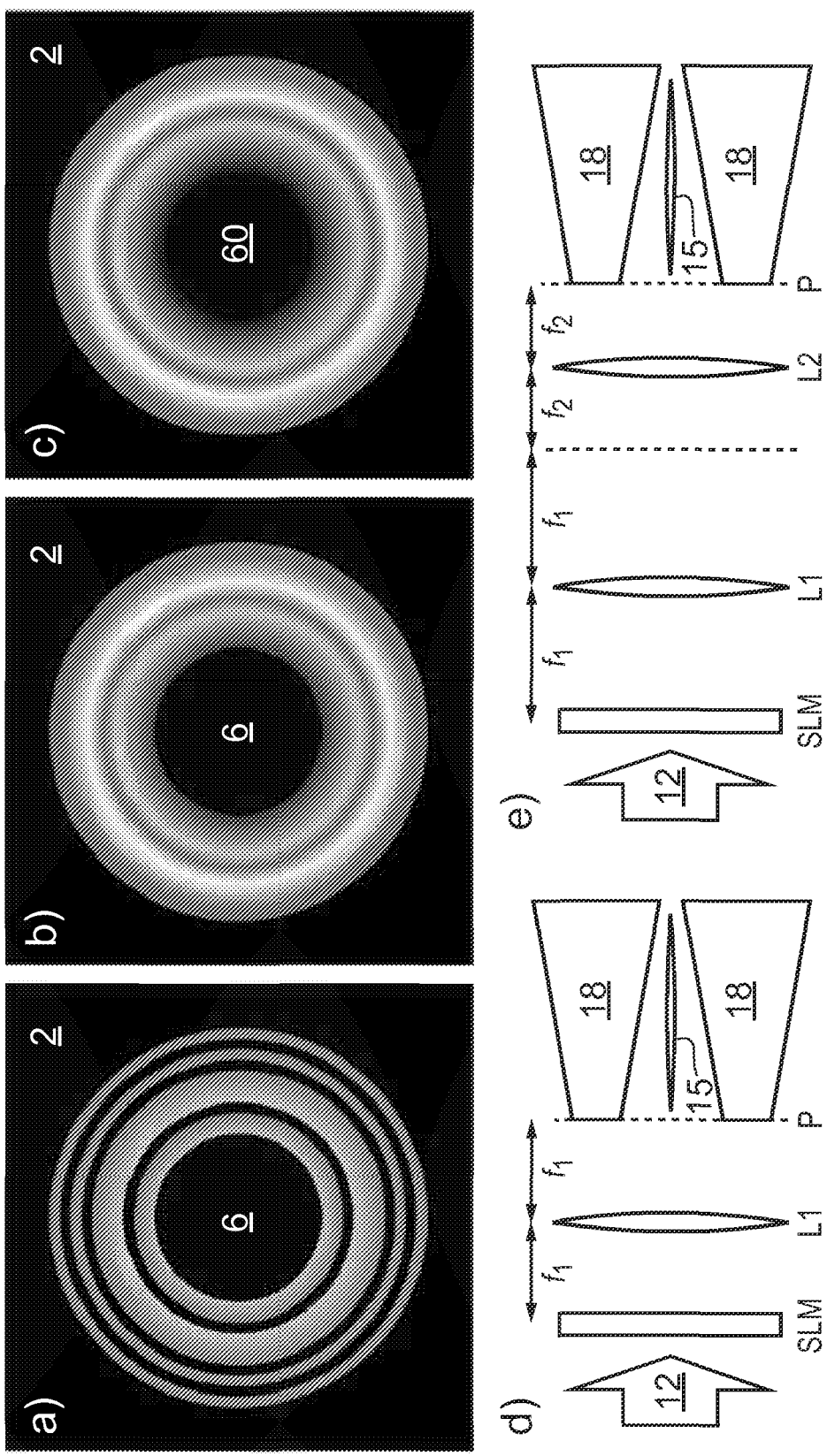
FIGS. 8a to 8e illustrate optical needle super-oscillatory lenses which include a spatial light modulator (SLM) for modulating the incident light beam.

FIGS. 8a to 8c illustrate optical needle super-oscillatory lenses which include a spatial light modulator (SLM) for modulating the incident light beam. Black regions are opaque. White regions are transparent. Grey regions are indicate light incident on and passing through the nanolens that has been modulated, in amplitude and/or phase by the SLM.

FIG. 8a shows an optical needle super-oscillatory lens comprising a SLM which is used to modify the beam incident on a binary super-oscillatory lens according to the above examples. In this case, the nanolens consists of a physical blocking region 6, some physical structuring in the structured region and a physical surrounding region. The structured area is formed by a combination of a binary mask and modulation of phase and/or amplitude by the SLM. The SLM could be modulating the amplitude and/or phase of the input beam.

FIG. 8b shows an example where the structure of the structured area of an optical needle super-oscillatory lens is formed by an SLM and the blocking area is formed by a physical blocking area, such as a metal disc. The SLM is thus used to achieve structuring of the light around the physical blocking element.

FIG. 8c shows an example where an optical needle super-oscillatory lens, including the blocking area, is formed by an SLM. In this case the physical blocking region has been replaced with a dark region formed by the SLM 60.

In each of the examples of FIGS. 8a to 8c, the SLM can be used purely to modulate amplitude, purely to modulate phase, or to modulate both phase and amplitude. In other words, the lens structure can be designed to be implemented with any one of these three possibilities.

FIG. 8d shows a holographic optical arrangement [9] for an SLM-implemented optical needle super-oscillatory lens. Here the nanolens plane P is in the Fourier plane of the SLM. A collimated light beam 12 is incident on the SLM and is modulated to form some desired field pattern in the Fourier plane (after passing through lens L1) which is coincident with the nanolens plane P. Any physical component of the nanolens (a blocking region or structuring as in FIGS. 8a-c) is positioned in the nanolens plane P. The optical needle 15 is formed in the region beyond the nanolens plane.

FIG. 8e shows another optical arrangement for an SLM-implemented optical needle super-oscillatory lens. Here the nanolens plane P is in the conjugate plane of the SLM. A collimated light beam 12 is incident on the SLM and is modulated to form some desired field pattern in the conjugate plane (after passing through lenses L1 and L2) which is coincident with the nanolens plane P. Any physical component of the nanolens (a blocking region or structuring as in FIGS. 8a-c) is positioned in the nanolens plane P. The optical needle 15 is formed in the region beyond the nanolens plane. The relative focal lengths of L1 and L2 ($f_1$ and $f_2$ respectively) can be adjusted to magnify or minify the desired field pattern in the nanolens plane P.

Imaging Apparatus

Figure 9:
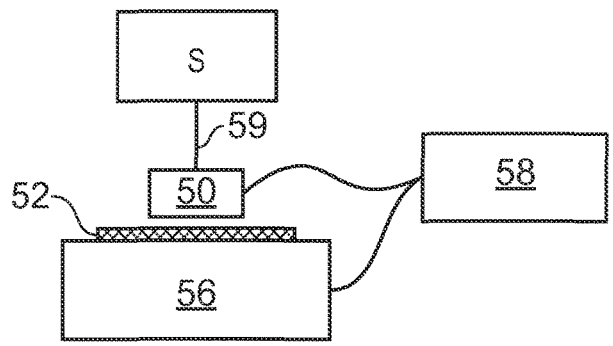
FIG. 9 shows an imaging system incorporating an optical needle nanolens.

FIG. 9 shows an imaging system incorporating an optical needle nanolens. The object 50 is placed on an object holder 56. A scanning head 50, incorporating an optical needle nanolens, is mounted above the object. A light source S supplies a coherent light beam through a transmission system 59 that could be free space or waveguide based. The detector electronics 58 also control the movement of the scanning head relative to the object by moving either the scanning head or the object holder.

FIGS. 10a to 10d show different example imaging systems based on the optical needle super-oscillatory lens. The system construction is similar to that of scanning near-field optical microscopy [2], but without requiring the super-oscillatory lens to be in the near-field of the object to be imaged. In each example system, the optical needle is scanned over the object to be imaged. Scanning can be achieved by moving the object, by moving the head incorporating the super-oscillatory lens, or by a combination of both.

Light emitted by the object is collected by a detector. In conventional microscopy operational modes, the light to be detected will be spectrally scattered light. In other modes of operation, the light to be collected could be luminescence induced by the incident light, Raman scattered light or light originating from any other known light scattering or generation effect. The light scattered from the object is detected and collected by the detector. An image of the object is built up based on the light scattered from each position on the sample.

Figure 10:
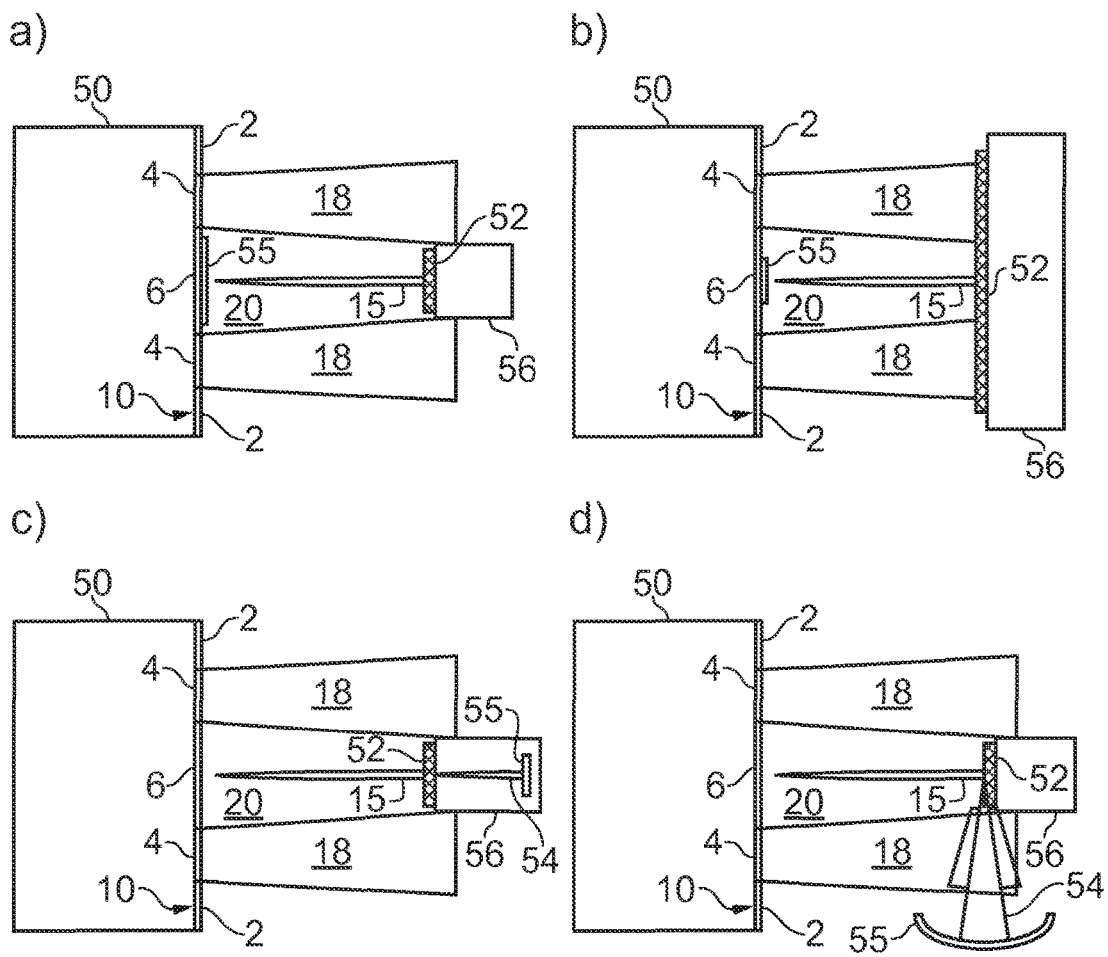
FIGS. 10a to 10d show different example imaging systems based on the optical needle super-oscillatory lens.

FIG. 10a shows a first example imaging system. A sample object 52 is arranged on a sample holder 56. A needle focus super-oscillatory lens 10 is arranged on a head 50. The super-oscillatory lens 10 comprises blocking, structured and opaque surrounding areas 6, 4 and 2 respectively so that incident light passing through the lens emerges in a sideband region 18 following conventional diffraction and in a super-oscillatory needle-shaped focus 15 contained in a shadow region 20. The sample 52 is arranged in the shadow region part way along the needle-shaped focus. The sample 52 extends transverse to the optical axis so that xy motion of the head 50 relative to the sample holder 56 can be used to scan the focus over the sample. Suitable xy-positioning motors will be provided on the head or the sample holder or both. It is noted that in this example, the sample is sized and positioned along the optical axis such that it is significantly smaller than the field of view, which enables the focus to be scanned over the full surface of the sample without the sample entering the sideband region. Control of z-motion is also generally necessary and z-positioning motors can be provided for that purpose on the head and/or sample holder. However, the elongate shape of the needle focus means that the precision of the control in the z-direction need only be at the length scale of the length of the needle-shaped focus. Light back-scattered from the sample 52 is detected by a photodetector 55 which is arranged in the shadow region 20 adjacent to the blocking element 6 with a light sensitive area facing the needle-shaped focus 15. The photodetector 55 is preferably an array detector, such as a charged couple device (CCD), but could be a single channel detector such as a p-i-n diode. The sensitive area of the photodetector is shaped and dimensioned to fill as much as possible of the area of the blocking area 6 in order to maximize the amount of back-scattered light that is collected from the object 52, although it will generally be understood that most detectors will have square or rectangular sensitive areas, whereas the blocking area will in most examples be circular. In this example it is noted that the object to be imaged is sized and positioned along the propagation axis so that it is considerably smaller than the field of view such that the optical needle 15 can be scanned in x and y over the object 52, or at least the area of the object which it is desired to image, without the object entering the sideband region.

FIG. 10*b* shows a second example imaging system for imaging larger objects which will or may laterally extend into the sideband region during scanning. In this case, the set-up is identical to that of FIG. 10*a* except that the detector is modified to limit the amount of light that is sensed from scattering in the sideband region. The most simple modification is to reduce the size of the sensitive area of the detector as illustrated so that the amount of back-scattered light collected from the sidebands is reduced. Another modification is to arrange an optical element (not shown) between the detector and the optical needle region so that light scattered from the optical needle region is directed to the detector, whereas light scattered from the sideband region is directed to outside the detector. If a CCD detector is used, the sensitive area can be sized to be as large as possible, i.e. similar to what was mentioned above for the example of FIG. 10*a*, and post-processing used to determine the optimum size of sensitive area based on a compromise between signal (i.e. light scattered from the object) and noise (i.e. light scattered from the sideband region).

FIG. 10*c* shows a third example imaging system which can be described with reference to its difference from the set-up of FIG. 10*a*. Namely, the detector position is changed, so that the detector 55 is arranged downstream of the object 52 along the propagation axis so as to collect light 54 transmitted through the object 52 to be imaged. In a modification of this arrangement the light from the optical needle 15 that has directly transmitted through the object without scattering could be eliminated, either by placing a small blocking element (not shown) between the object and detector, e.g. as part of a front-end to the detector, or by having a detector with an insensitive area centred at the propagation axis. Such an insensitive area might be achieved by post-processing in the case of an array detector by rejecting light from around the propagation axis.

FIG. 10*d* shows a fourth example imaging system which can be described with reference to its difference from the set-up of FIG. 10*a*. Namely, the detector position is changed, so that a detector 55 is arranged to the side of the object to collect light 54 scattered laterally from the object. The detector 55 is shown positioned outside the sideband region 18, it being assumed that the surrounding area of the super-oscillatory lens 10 is opaque, so that light from the sideband region is not collected. A laterally positioned detector may be curved round to collect light scattered in all directions in a plane perpendicular to the propagation axis, i.e. may form a closed ring around the object, or may only collect light scattered in a defined arc of scattering directions.

In summary of these example imaging systems, imaging can be carried out using light reflected, transmitted or scattered sideways by the sample, or some combination of these.

Another application of the optical needle is for materials processing. The microscopy set up described above is also suitable for materials processing in which the optical needle interacts with an object to be processed to effect processing. Although the detector needed for optical microscopy as described above would generally not be necessary for materials processing, a detector could be used in a feedback loop to assist control of the intersection of the optical needle and object to be processed.

The object to be processed, or material to be processed that forms part of the object, is in some way sensitive to the light of the optical needle. This sensitivity could be an optical effect or a heating effect with example types of processing including: melting of the material, ablation, exposing a photoresist material as part of a photolithographic process, and polymerisation.

By placing the material in the optical needle, the material can be locally processed with a feature size given by the width of the needle, which as described above can be sub-wavelength. By moving the scanning head and material relative to each other, the material can be patterned over an area.

In the case that the material to be processed is larger than the field of view of the optical needle (see FIG. 9*b*), additional consideration needs to be given to ensuring that the material is not affected by the light in the sidebands, and responds only to the optical needle. As the intensity in the needle is typically significantly higher than that of the sidebands, a nonlinear response of the material to light would achieve significantly greater exposure of the high intensity needle than the low intensity sidebands. If the material has a threshold intensity, below which no light induced changes occur, then the intensity of the optical needle may be adjusted such that the needle is above, and the sidebands below, the threshold intensity. This threshold behaviour is commonly observed in photolithography, for example. Another possibility is to temporarily modify the material (for example by applying a removable mask) in the region outside the field of view so that the interaction of light from the sideband region is only with the removable mask, which is then removed after completion of the optical needle processing.

The optical needle is particularly advantageous for materials processing applications, not only because of its narrowness, but also because of the elongate shape of the needle along the propagation axis. This significantly relaxes or removes requirements for controlling the distance between the head and the object during scanning. If the variation in distance between the super-oscillatory lens and the object during scanning is small compared with the length of the optical needle, then no control of this distance is required during scanning. By way of comparison, with a conventional focus there is inevitably a defined focal plane which will need to be kept coincident with the plane of the object which thus imposes strict requirements on control in the direction of the propagation axis, i.e. z-position control, so that generally it is necessary to adjust z on a continuous or continual basis during scanning.

FIG. 11 shows an optical memory read head or read/write head for an optical disc drive or other optical data storage device which is optically the same as the set-up of FIG. 10b. An optical needle super-oscillatory lens 10 is part of a head 50 which is scanned over an optical memory carrier 52, such as a disc. The disc may be arranged on a spinning platter (not shown), such as a CD or DVD. The scanning may involve moving the head 50, moving the optical memory carrier 52 or a combination of both. For example in the case of a CD or DVD drive, the CD is spun, i.e. rotated, and the head is moved in the radial direction and also in the z direction, i.e. along the propagation axis, to control spacing between the head and the surface of the spinning disc. A photodetector 55 is arranged in the shadow region 20 adjacent to the blocking element 6 with a light sensitive area facing the needle-shaped focus to collect light reflected from the surface of the memory medium 52 which is arranged to intersect the optical needle focus 15 from the super-oscillatory lens 10. The photodetector will typically be a single channel detector such as a p-i-n diode or perhaps multiple adjacent photodetectors arranged in a group, for example 4 such detectors arranged in a square or rectangle formation. Examples include a disc drive for reading CDs and DVDs, a disc drive for performing read and write operations on a recordable format of CD or DVD, and a head for reading and writing to a phase change memory which may be in a CD or DVD format or some other format not based on a spinning disc. To read the memory, the read head is scanned over the memory layer. Variation in reflected light gives the value—typically 0 or 1—of the data held in the memory cell under the optical needle.

In the case of a read/write medium, to write to a cell, the intensity of the laser generating the incident light beam is increased so that the intensity of the optical needle is increased above a threshold value, or time varied in a manner, needed to locally modify the material and write to a single optical cell, i.e. enforce a physical state which may require a change of state of the material at the cell location. The sub-wavelength transverse size of the optical needle permits the memory cells to be closer packed than when using a conventional lens, while the long axial length of the optical needle substantially reduces the level of position control required in the z direction to keep the memory illuminated with a sufficiently tightly focused spot.

FIG. 12a shows a focus with a conventional lens L where the light is focused down to a waist having a spot size (dimension illustrated with vertical arrows) and focal depth (dimension illustrated with horizontal arrows).

FIG. 12b shows a focus in an optical needle super-oscillatory lens arrangement illustrating spot size (dimension illustrated with vertical arrows) and focal depth (dimension illustrated with horizontal arrows).

Example values for a light wavelength in the visible range are used. The conventional lens has a numerical aperture NA of 0.9 and a focal depth of 0.34 μm. The beam waist at the focus, i.e. the diameter of the focus or spot size, could be about 0.6 μm. The optical needle super-oscillatory lens has a focal depth of around 10 μm, i.e. the full length of the optical needle. The diameter of the focus could be about 0.4 μm. The greater focal depth (30 times greater in the numerical example) of the optical needle super-oscillatory lens is a significant advantage in any application in which it is necessary to scan a small spot over a surface, since the requirement of a feedback loop to maintain the focus on the surface within the focal depth is significantly relaxed. In the numerical example, the requirement is to maintain this dimension within a range of 10 μm instead of 0.34 μm. In some applications, the specification for z-dimension control with the needle focus may be such that no feedback is required during scanning. In other words, the focus can be set before scanning and the scanning carried out without adjustment of z during scanning.

We conclude with some general points.

Our simulations show that many if not all "conventional" super-oscillatory lenses, such as the lens illustrated in FIG. 3a/b, may be converted to an optical needle lens by providing an opaque central region to obscure the radially innermost structure of the lens. However, it has been found that a purposefully designed structure, i.e. a lens designed with the blocking area in place from the outset, shows a noticeably smaller FWHM along the length of the optical needle. In short, although a generic super-oscillatory lens may be converted to an optical needle lens by the addition of a blocking area, all things being equal, it will not perform as well as a purpose designed optical needle lens.

It has been assumed in the above discussion that the super-oscillatory lens is designed to form an optical needle for incident light of a single design wavelength. However, the mask can be designed to focus multiple discrete wavelengths which are relatively close to one another into multiple respective optical needles which are likely to be partially overlapping and have similar dimensions. Moreover, a super-oscillatory lens could be designed to focus a continuum of wavelengths into a single broadband optical needle, as would be required if using a femtosecond laser source for example. The design of mask in this way would be computationally more intensive, but nevertheless feasible. Some compromises may have to be made in, for example, the mean FWHM of the optical needle compared to the single wavelength case.

Figure 13:
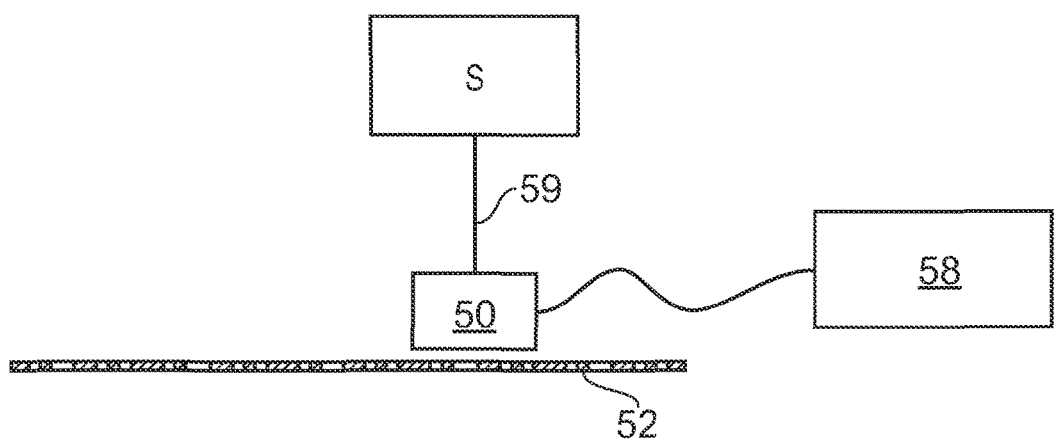
FIG. 13 shows an optical memory read/write system

FIG. 13 shows an optical memory read/write system, for example for a CD or DVD. A coherent light source S supplies light to a scanning head 50 via a transmission system 59. In a conventional CD drive, the scanning head includes a conventional lens to focus light onto the memory surface 52. The head detects both the optical memory state and various autofocus tracking parameters via electronics 58. The electronics are also responsible for controlling servos in the scanning head to ensure the lens remains in the correct position relative to the optical memory. We propose to replace the conventional lens in the scanning head with an optical needle nanolens.

In some embodiments, the binary mask that provides the optical needle nanolens can be applied to a portion of a conventional lens, typically a portion near the centre of the conventional lens. In this case, the central region of the lens structure would focus the light to an optical needle through the binary mask, and the peripheral regions would focus as a conventional lens. In the case of a conventional CD/DVD head, the autofocus is performed using light passing through the edges of a conventional lens. One use of a hybrid conventional/optical needle lens in which a binary mask is applied to a central portion of a conventional lens is therefore in a CD/DVD head. The central binary mask would focus the light to an optical needle for reading (and optionally writing) data, and the peripheral conventional lens region would be used for tracking the autofocus.

REFERENCES

1. U.S. Pat. No. 5,105,305 (Betzig & Trautman)
2. Hecht, B., et al., Scanning near-field optical microscopy with aperture probes: Fundamentals and applications. Journal of Chemical Physics, 2000. 112(18): p. 7761-7774.
3. WO2008/009931 (Zheludev et al)
4. Huang, F. M. and Zheludev, N. I., Super-resolution without Evanescent Waves. Nano Letters, vol. 9(3), p 1249-1254, 30 Jan. 2009 http://pubs.acs.orq/doi/abs/10.1021/nl9002014
5. O'Shea, D. C., et al., Diffractive Optics: Design, Fabrication and Test. 2004: SPIE.
6. Robinson, J. and Y. Rahmat-Samii, Particle swarm optimization in electromagnetics. IEEE Transactions on Antennas and Propagation, 2004. 52(2): p. 397-407.
7. Kennedy, J. and R. Eberhart, Particle swarm optimization. 1995 Ieee
International Conference on Neural Networks Proceedings, Vols 1-6, 1995: p. 1942-1948.
8. Jin, N. B. and Y. Rahmat-Samii, Advances in particle swarm optimization for antenna designs: Real-number, binary, single-objective and multiobjective implementations. Ieee Transactions on Antennas and Propagation, 2007. 55(3): p. 556-567.
9. Vellekoop, I. M. and A. P. Mosk, Focusing coherent light through opaque strongly scattering media. Optics Letters, 2007. 32(16): p. 2309-2311.

The invention claimed is:

1. An optical device comprising:
a super-oscillatory lens arranged to receive a light beam having one or more wavelength components, the lens having a pre-defined pattern to spatially modulate the light beam in amplitude and/or phase; and
a blocking element formed integrally with the lens in the plane of the lens, or as a separate component adjacent to the lens, which is opaque to the light beam to cause diffraction of the light beam around the blocking element and formation of a shadow region,
wherein the super-oscillatory lens is structured and the blocking element dimensioned so that in combination they focus the light beam to form an elongate needle-shaped focus in the shadow region.

2. The device of claim 1, wherein the needle-shaped focus extends over a distance of at least 'n' wavelengths of at least one of the wavelength components, wherein 'n' is at least 3, 4, 5, 10 or 20.

3. The device of claim 1, wherein the needle-shaped focus has a full width half maximum perpendicular to the optical axis of less than half the wavelength of said at least one of the wavelength components, preferably over its full length.

4. The device of claim 1, further comprising a light source operable to generate the light beam.

5. The device of claim 1, wherein the super-oscillatory lens is formed at least in part from a binary mask which is generally opaque but is structured with a pre-defined pattern of optically transparent apertures to spatially modulate the light beam in amplitude.

6. The device of claim 5, wherein the optically transparent apertures comprise a plurality of concentric rings.

7. The device of claim 5, wherein the optically transparent apertures comprise a plurality of holes.

8. The device of claim 5, wherein the super-oscillatory lens additionally includes a spatial light modulator arranged adjacent to the binary mask and operable to spatially modulate the light beam in phase and/or amplitude.

9. The device of claim 1, wherein the super-oscillatory lens is formed at least in part from a spatial light modulator which is programmable to provide a pre-defined spatial modulation of the light beam in phase and/or amplitude.

10. The device of claim 1, further comprising a detector arranged in a dark part of the shadow region behind the blocking element and facing the needle-shaped focus to collect back-scattered light.

11. The device of claim 1, further comprising a detector arranged downstream of the needle-shaped focus.

12. An optical beam lithography/machining/welding apparatus comprising
a sample platform on which an object for processing can be arranged;
a head incorporating an optical device according to claim 1; and
a positioning apparatus operable to move the sample platform and head relative to each other to align the needle-shaped focus with any specified location on the sample so that activation of the light beam can be used to process the object locally.

13. The apparatus of claim 12, wherein the positioning apparatus is operable to scan the needle-shaped focus in a continuous way over the object such that a part of the needle-shaped focus is maintained in intersection with a surface or buried interface of the object.

14. A materials processing method comprising:
providing an object to be processed;
positioning an optical device according to claim 1 at a location adjacent to a surface of the object such that the needle-shaped focus extends at that location into the object; and
activating the light beam to use the needle-shaped focus to process the object locally.

15. The method of claim 14, further comprising: scanning the optical device over the object to process the object at a plurality of locations.

16. The method of claim 14, wherein the processing achieves machining of the object by removal of material from the object.

17. The method of claim 14, wherein the processing achieves local melting and refreezing of material from the object.

18. An imaging apparatus comprising:
a sample platform on which an object for imaging can be arranged;
a head incorporating an optical device according to claim 1; and
a positioning apparatus operable to move the sample platform and head relative to each other to align the needle-shaped focus with any specified location on the sample so that activation of the light beam can be used to image the object locally, the positioning apparatus being operable to scan the needle-shaped focus in a continuous way over the object such that a part of the needle-shaped focus is maintained in intersection with a surface or buried interface of the object.

19. An imaging method comprising:
providing an object to be imaged;
positioning an optical device according to claim 1 at a location adjacent to a surface of the object such that the needle-shaped focus coincides with the surface at that location;

activating the light beam to use the needle-shaped focus to probe the surface locally at said location;
detecting light from said location with the detector; and
scanning the optical device over the object to probe the surface at a plurality of locations.

* * * * *